United States Patent
Lin

(10) Patent No.: US 7,392,450 B2
(45) Date of Patent: Jun. 24, 2008

(54) METHOD AND APPARATUS OF COMPENSATING FOR SIGNAL RECEIVING ERROR AT RECEIVER IN PACKET-BASED COMMUNICATION SYSTEM

(75) Inventor: Jeff Lin, Taipei (TW)

(73) Assignee: VIA Technologies, Inc., Hsin-Tien (TW)

( * ) Notice: Subject to any disclaimer, the term of this patent is extended or adjusted under 35 U.S.C. 154(b) by 63 days.

(21) Appl. No.: 10/885,649

(22) Filed: Jul. 8, 2004

(65) Prior Publication Data

US 2006/0010361 A1    Jan. 12, 2006

(51) Int. Cl.
*G06F 11/00* (2006.01)
*H04L 1/00* (2006.01)

(52) U.S. Cl. .............. 714/747; 375/346; 375/285; 375/316; 375/344; 380/268; 380/273; 380/274

(58) Field of Classification Search ......... 714/747, 714/746, 700
See application file for complete search history.

(56) References Cited

U.S. PATENT DOCUMENTS

| | | | | |
|---|---|---|---|---|
| 5,247,355 | A * | 9/1993 | Frederiksen | 375/240.12 |
| 5,732,111 | A | 3/1998 | Walley | 375/344 |
| 5,764,298 | A * | 6/1998 | Morrison | 348/500 |
| 6,054,894 | A * | 4/2000 | Wright et al. | 330/149 |
| 6,259,738 | B1 * | 7/2001 | Yamaguchi et al. | 375/240.21 |
| 7,006,529 | B2 * | 2/2006 | Alastalo et al. | 370/468 |
| 2003/0053564 | A1 * | 3/2003 | Kim et al. | 375/326 |
| 2004/0101068 | A1 * | 5/2004 | Wang et al. | 375/324 |
| 2004/0125779 | A1 * | 7/2004 | Kelton et al. | 370/338 |
| 2004/0128605 | A1 * | 7/2004 | Sibecas et al. | 714/746 |

FOREIGN PATENT DOCUMENTS

| | | |
|---|---|---|
| CN | 1447598 A | 10/2003 |
| CN | 1489307 A | 4/2004 |
| EP | 1047233 A2 | 10/2000 |

OTHER PUBLICATIONS

PCT Search Report, Apr. 2005.

* cited by examiner

*Primary Examiner*—Cynthia Britt
*Assistant Examiner*—Guerrier Merant
(74) *Attorney, Agent, or Firm*—Thomas, Kayden, Horstemeyer & Risley

(57) ABSTRACT

A method and an apparatus of compensating for a signal receiving error at a receiver in a packet-based communication system. In the invention, frequency offset estimation and DC offset estimation obtained in a current packet are re-used in a next packet if the receiver is an intended recipient of the current packet and the current packet is received correctly, verified by CRC-32 checking in the PHY layer and the DA checking in the MAC layer, respectively. Thereby, the overall receiver performance and stability can be improved from packet to packet and the estimation algorithm is simplified.

14 Claims, 6 Drawing Sheets

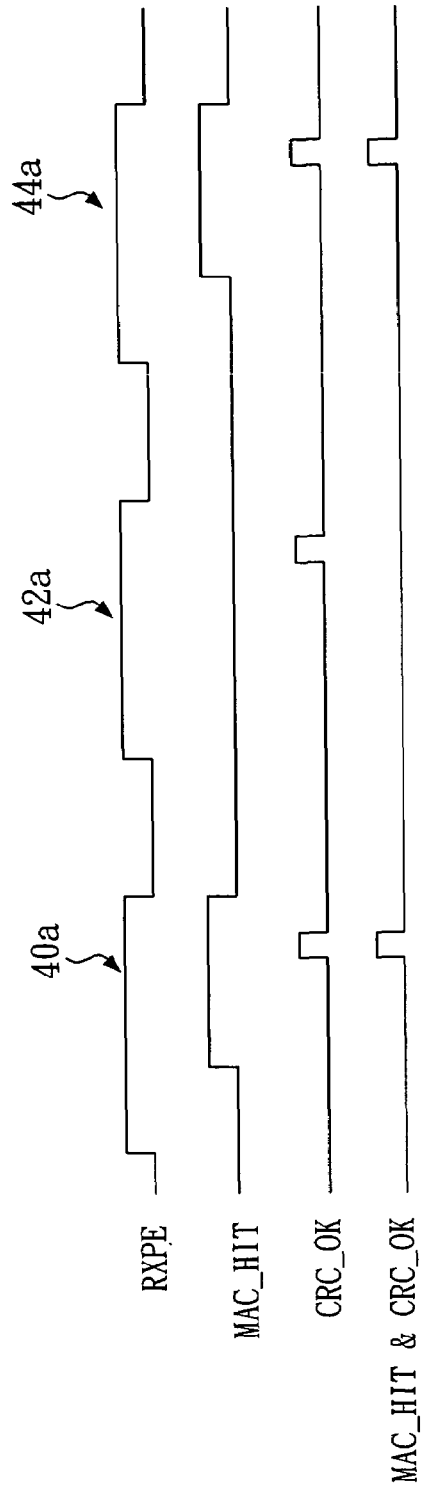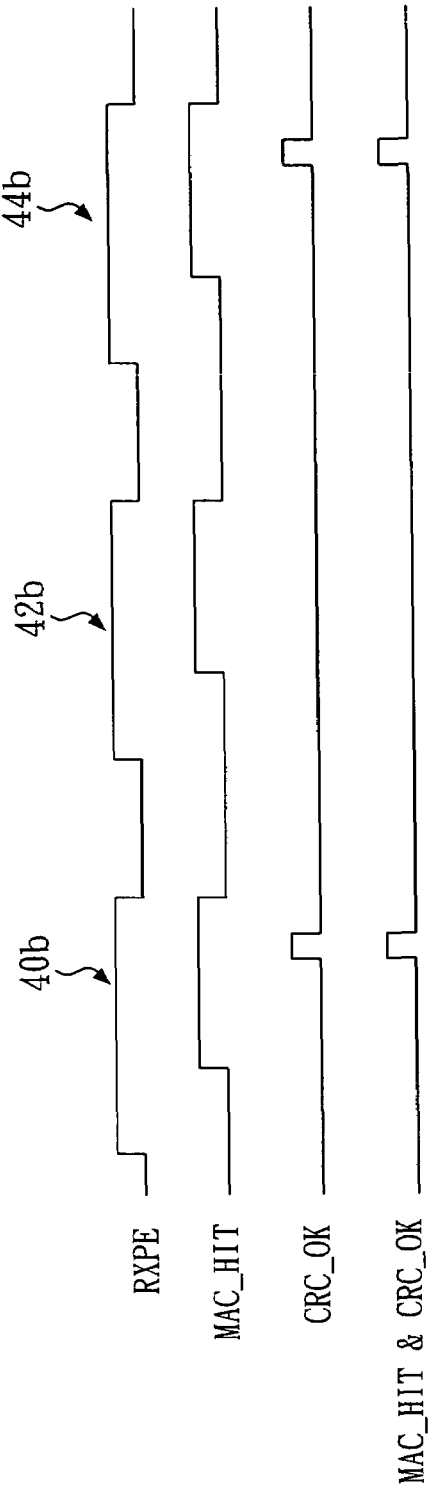
FIG. 4A
FIG. 4B

US 7,392,450 B2

METHOD AND APPARATUS OF COMPENSATING FOR SIGNAL RECEIVING ERROR AT RECEIVER IN PACKET-BASED COMMUNICATION SYSTEM

BACKGROUND OF THE INVENTION

1. Field of the Invention

The present invention relates to packet-based communication technology, and more particularly to recovery of a received signal at a receiver in a packet-based communication system.

2. Description of the Related Art

IEEE 802.11 is a well know packet-based wireless communication standard using OFDM (Orthogonal Frequency Division Multiplexing) modulation technique and is now adopted as the standard in wireless LANs (Wireless Local Area Network).

The IEEE 802.11 specification defines requirements for a physical (PHY) layer and a medium access control (MAC) layer, which is one of the two sub-layers in a data link layer according to the OSI (Open System Interconnection) network model. Commonly-seen IEEE 802.11a, 802.11b and 802.11g are different PHY layer standards and they all follow the same MAC layer standard.

FIG. 1 shows a frame format in the PHY layer of the IEEE 802.11a standard. As shown, a packet frame is divided into three portions, a preamble portion 10, a header portion 12 and a data portion 14. The preamble portion 10, which is also referred to as a training sequence, consists of a short preamble field with 10 short symbols and a long preamble field with two long symbols. In a WLAN receiver, inherent problems, such as DC offset and AGC, must be solved. In a high speed communication, the transmitted and corresponding received signals are often different from each other, and therefore, timing synchronization and frequency offset estimation must be performed. In addition, the transmission channel is unknown at the receiver and thus must be estimated. These are achieved based on the training sequence in the preamble field at the beginning of each frame format.

The header portion 12 is used for carrying information about the coding rate and the length of the packet.

The data portion 14 includes the PSDU field (i.e., packet data), the tail bits (six "0's") and the pad bits.

FIG. 2 shows a general frame format in the MAC layer of the IEEE 802.11 standard. When the packet data is decoded in the PHY layer and delivered to the MAC layer, it will be further identified whether or not the current packet is intended to be transmitted to this receiver. This is performed by examining whether or not the destination address (DA) in the field "Add 1" in FIG. 2 matches an identity address of the receiver (for example, the MAC Address on a network interface card). In addition, a CRC checksum calculation is performed to verify the received packet data, that is, to detect transmission errors, by using the 32-bit CRC code contained in the field "FCS (Frame Check Sequence)".

In the above exemplified IEEE 802.11a specification, the preamble portion 10 is very short, with a very limited training duration of only 16 μs for the receiver to retrieve all the required information in order to decode data correctly. This implies a complicated algorithm and a high cost to implement the estimation circuit.

Therefore, there is a need for development of a receiver with a simpler algorithm for retrieving the required information while allowing the estimated data, such as DC offset estimation, frequency offset estimation and channel estimation, in the receiver to well match with the transmitted data to improve the receiver performance.

SUMMARY OF THE INVENTION

It is an object of the present invention to provide a method and an apparatus of compensating for a signal receiving error at a receiver in a packet-based communication system, in which the estimated data, such as DC offset estimation and frequency offset estimation, obtained in a current packet can be re-used to reduce on-going signal receiving errors.

The above object is achieved by providing a method and an apparatus of compensating for a signal receiving error at a receiver in a packet-based communication system, characterized by re-using an estimated data, such as frequency offset estimation and DC offset estimation, obtained in a current packet to compensate for a signal receiving error in the next packet if the receiver is an intended recipient of the current packet and the current packet is received correctly.

These two conditions can be verified by destination address (DA) checking in the MAC layer and CRC-32 checking in the PHY layer, respectively.

The estimated data continues to be improved through the packet receiving duration until it is latched at the end of the packet.

If the transmission channel is time-invariant, the re-use scheme may also apply to channel estimation.

By re-use of an estimated data for compensating for a signal receiving error, it is possible to further improve the overall receiver performance and stability from packet to packet and the estimation algorithm is allowed to be simplified.

BRIEF DESCRIPTION OF THE DRAWINGS

Objects and advantages of the present invention will be fully understood from the detailed description to follow taken in conjunction with the embodiment as illustrated in the accompanying drawings, wherein:

FIGS. 4A and 4B are timing diagrams of two examples for explaining the conditions for applying the data latch operation according to the present invention;

DETAILED DESCRIPTION OF THE PREFERRED EMBODIMENT

In the present invention, a PHY layer estimation algorithm continues to refine an estimation data until the end of packet receiving duration and the accurate estimation data obtained in a current frame will be re-used in compensating for a signal receiving error in a next frame, instead of only using the limited training sequence in the beginning of each frame every time a new frame is received.

In deciding whether or not an estimation data obtained in the current packet is allowed to be re-used in the next packet, two conditions are considered. First, it should be determined whether or not the receiver is an intended recipient of the current packet. Second, it should be determined whether or not the current packet is received correctly. Only if the above conditions are both positive should the obtained estimation data be latched for re-use. In the case that the receiver is the intended recipient of the packet, dissatisfaction of the second condition is referred to as an "estimation failure". Successive estimation failures for a predetermined number of times N, e.g., ten times, stop the re-use of a latched estimation data and start a new estimation by using the training sequence in the beginning of a frame, as set forth in the description of the related art.

Figure 2:
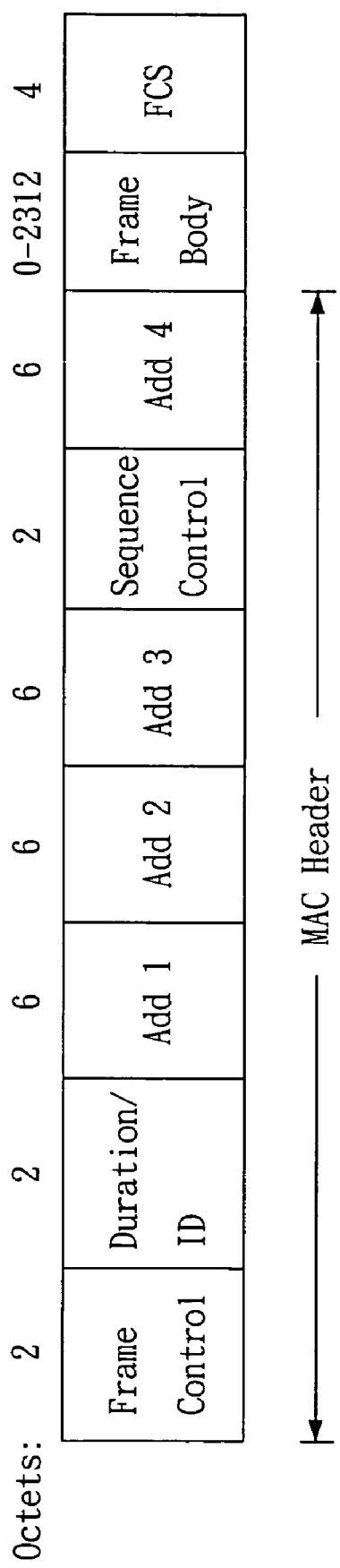
FIG. 2 shows a general frame format in the MAC layer of the IEEE 802.11 standard.

Referring back to FIG. 2, the first condition can be verified in the MAC layer, as described in the background art, by examining whether a destination address (DA) contained in the field "Add 1" of the current packet matches an identity address of the receiver. If the examination result is positive, a signal indicating that the receiver is an intended recipient of the current packet will be issued to the PHY layer.

Although the second condition can also be verified in the MAC layer, it is likely that a cyclic redundancy check (CRC) performed by the MAC layer delays too much time for the PHY layer to obtain a prompt examination result. Consequently, in a preferred embodiment, the FCS is checked in the PHY layer in order to immediately detect transmission errors.

As for which estimation data in the current packet is/are allowed to be re-used in the next packet, in the IEEE 802.11a standard, DC offset estimation and frequency offset estimation are selected in the preferred embodiment since the accuracy of DC offset estimation and frequency offset estimation significantly affect the decoding performance.

Some other estimation information, such as channel estimation, also contributes to the receiver performance. However, re-use of channel estimation depends on the channel characteristics. In the case of time-invariant channel parameters, the re-use scheme of the present invention may apply.

A preferred embodiment using the IEEE 802.11a standard will be described in detail for explaining be principles and spirits of the invention.

Figure 1:
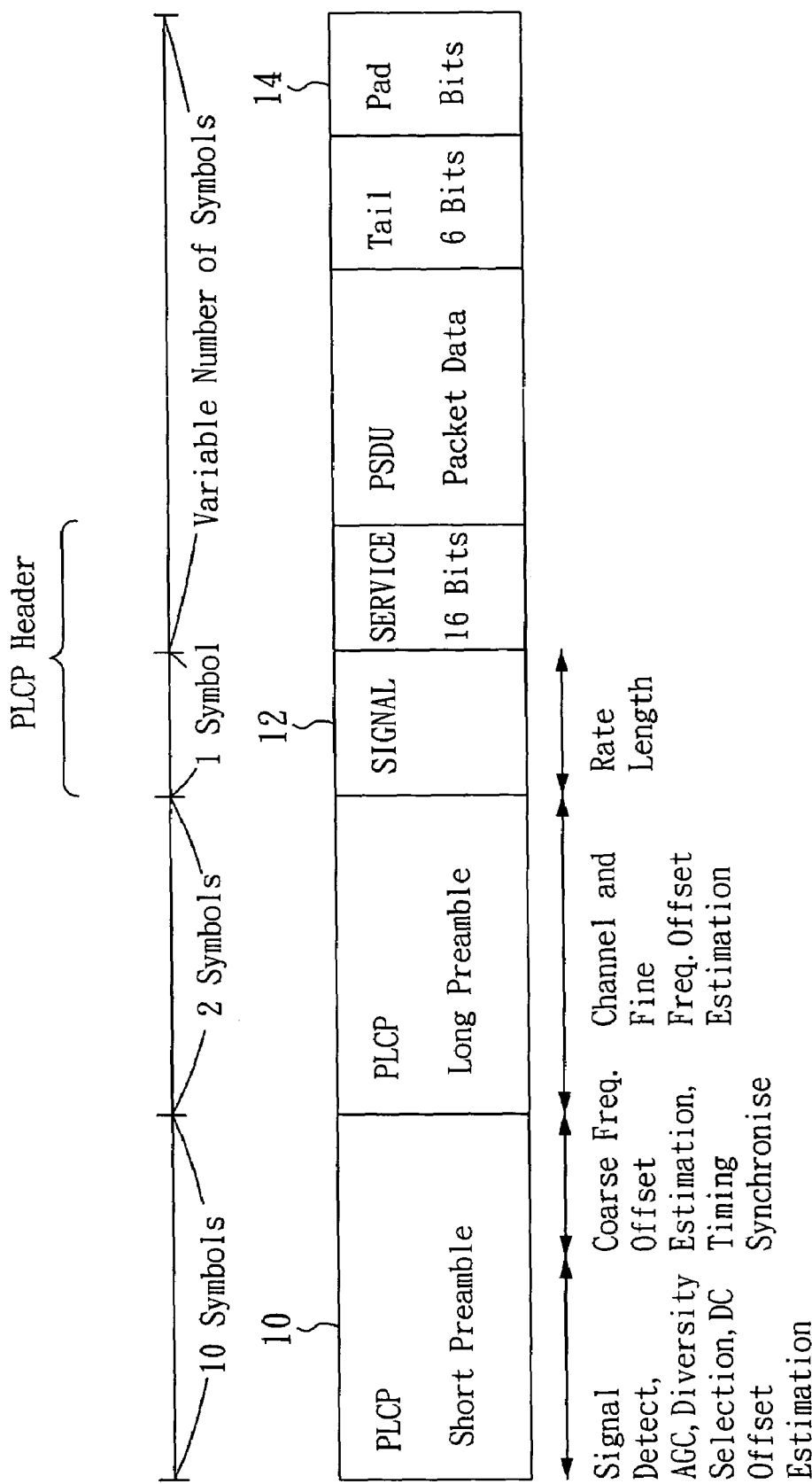
FIG. 1 shows a frame format in the PHY layer of the IEEE 802.11a standard.
Figure 3:
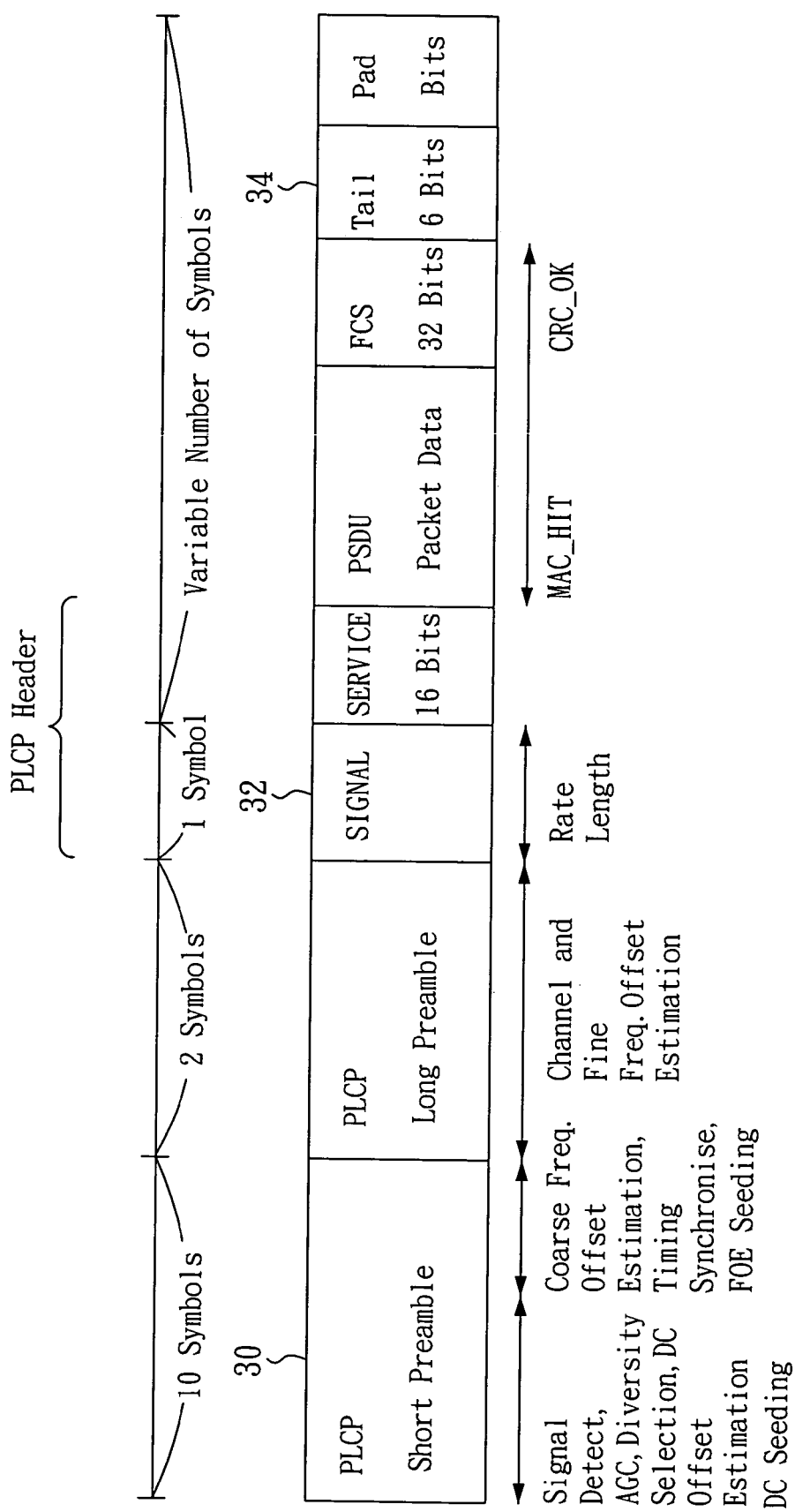
FIG. 3 shows a frame format in the PHY layer according to the present invention.

FIG. 3 shows a frame format in the PHY layer according to the present invention. As shown, a packet frame is divided into three portions, a preamble portion 30, a header portion 32 and a data portion 34, similar to the frame structure in FIG. 1. The differences in the present invention include: (i) DC estimation seeding and FOE (frequency offset estimation) seeding operations in the training phase; (ii) receiving a MAC_HIT signal indicating whether or not the receiver is an intended recipient of the current packet; and (iii) performing a CRC-32 check in the PHY layer and generating a CRC_OK signal indicating whether or not the current packet is received correctly.

FIGS. 4A and 4B are timing diagrams of two examples for explaining the conditions for applying the data latch operation according to the present invention. As shown in FIG. 4A, three data packets 40a, 42a and 44a are successively received in the receiver. The first and third packets 40a and 44a are detected to have a destination address identical to the ID address of the receiver, and thus the MAC layer asserts the MAC_HIT signal to the PHY layer. All of the packets 40a to 44a are received correctly and thus the CRC_OK signal is asserted for all the three packets. Since the MAC_HIT and CRC_OK must be both asserted to apply the data latch operation, the frequency offset estimation and DC offset estimation in the packets 42a will not be latched and seeded in the training phase of the next packet 44a since one of the conditions is not satisfied, and the estimation information obtained in the previous packet 40a will still be reused in the next packet 44a. On the other hand, the frequency offset estimation and DC offset estimation in both the packets 40a and 44a will be latched for re-use.

Similarly, in the example shown in FIG. 4B, only the frequency offset estimation and DC offset estimation in the packet 42a will not be latched for re-use because of being incorrectly received.

Figure 5:
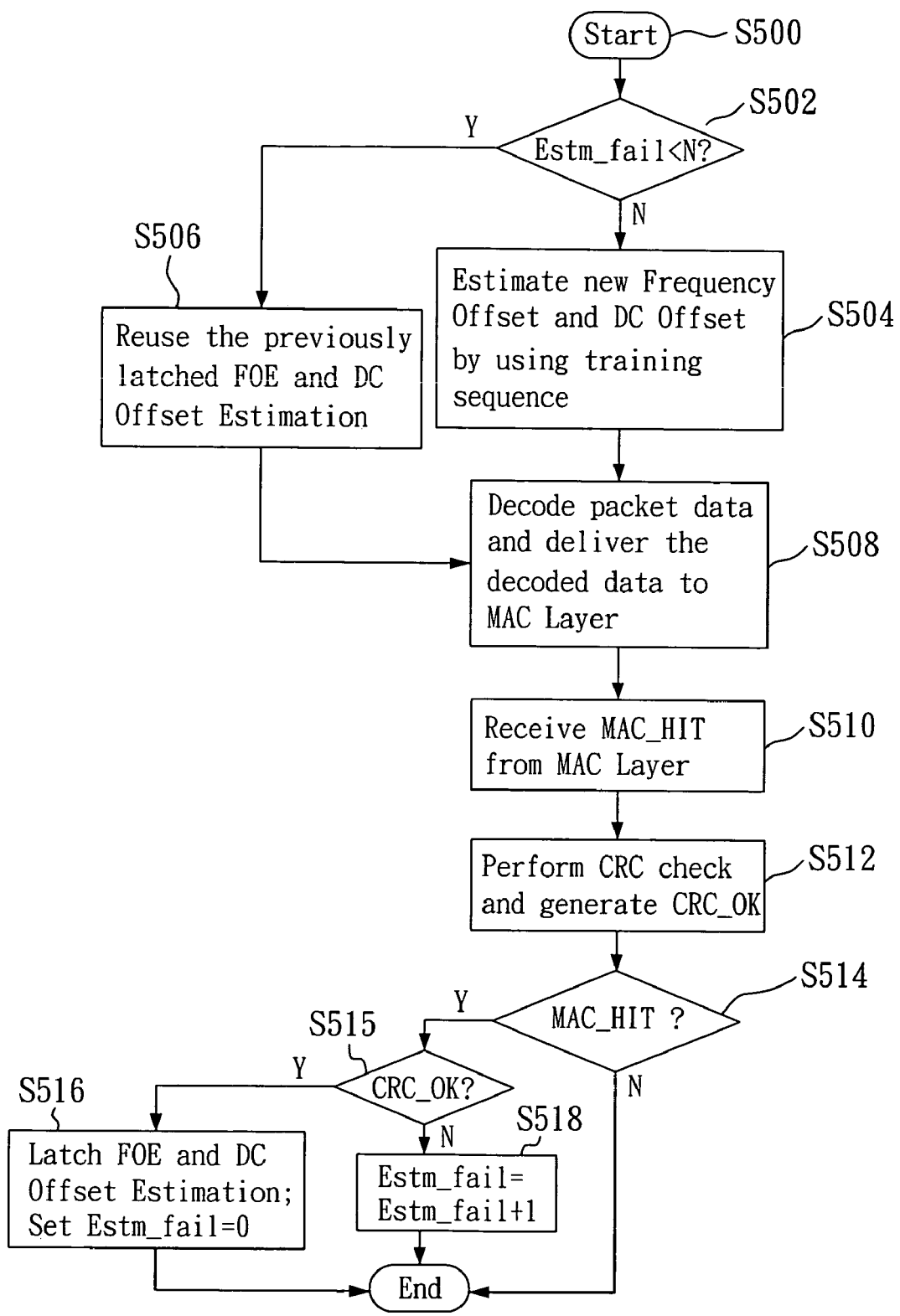
FIG. 5 is a flowchart for explaining a method of processing a received signal in a PHY layer according to the present invention.

The flowchart in FIG. 5 provides a better explanation for the method of processing a received signal in a PHY layer according to the present invention. In the flowchart, a variable number Estm_fail, which is initially set to zero, is used to denote a number of successive times of the estimation failures. As shown in FIG. 5, after the receiving of a frame begins in step S500, if the number Estm_fail is small than a predetermined number N, which is a positive integer and can be decided depending on circuit design (S502), then the previously latched frequency offset estimation and DC offset estimation are seeded, i.e., re-used in the training phase of the current packet in step 506; otherwise, the training sequence is used to evaluate new frequency offset and DC offset in step 504. An extreme example of the number N is 1, which means a single estimation failure will start a new estimation by using the training sequence.

After DC offset cancellation, symbol timing establishment and frequency compensation, the received signals are then transformed to frequency domain for performing channel correction, which is further followed by de-mapping, de-interleaving, de-puncturing, decoding and descrambling. These are denoted as decoding procedure in step S508. The finally descrambled data are output to the MAC layer, which then issues a MAC_HIT signal, informing the PHY layer of the DA verification result (S510). Further, a CRC checksum is performed by the PHY layer and a CRC_OK signal is generated accordingly (S512).

During the decoding procedure, the estimation of frequency offset and DC offset continues to be refined and, if both the MAC_HIT signal and the CRC_OK signal are asserted (S514 and S515), the refined estimation data are latched at the end of the current packet and the number Estm_fail is reset to zero (S516). If an estimation failure is detected in step S515, then add one to the number Estm_fail in step S518.

Figure 6:
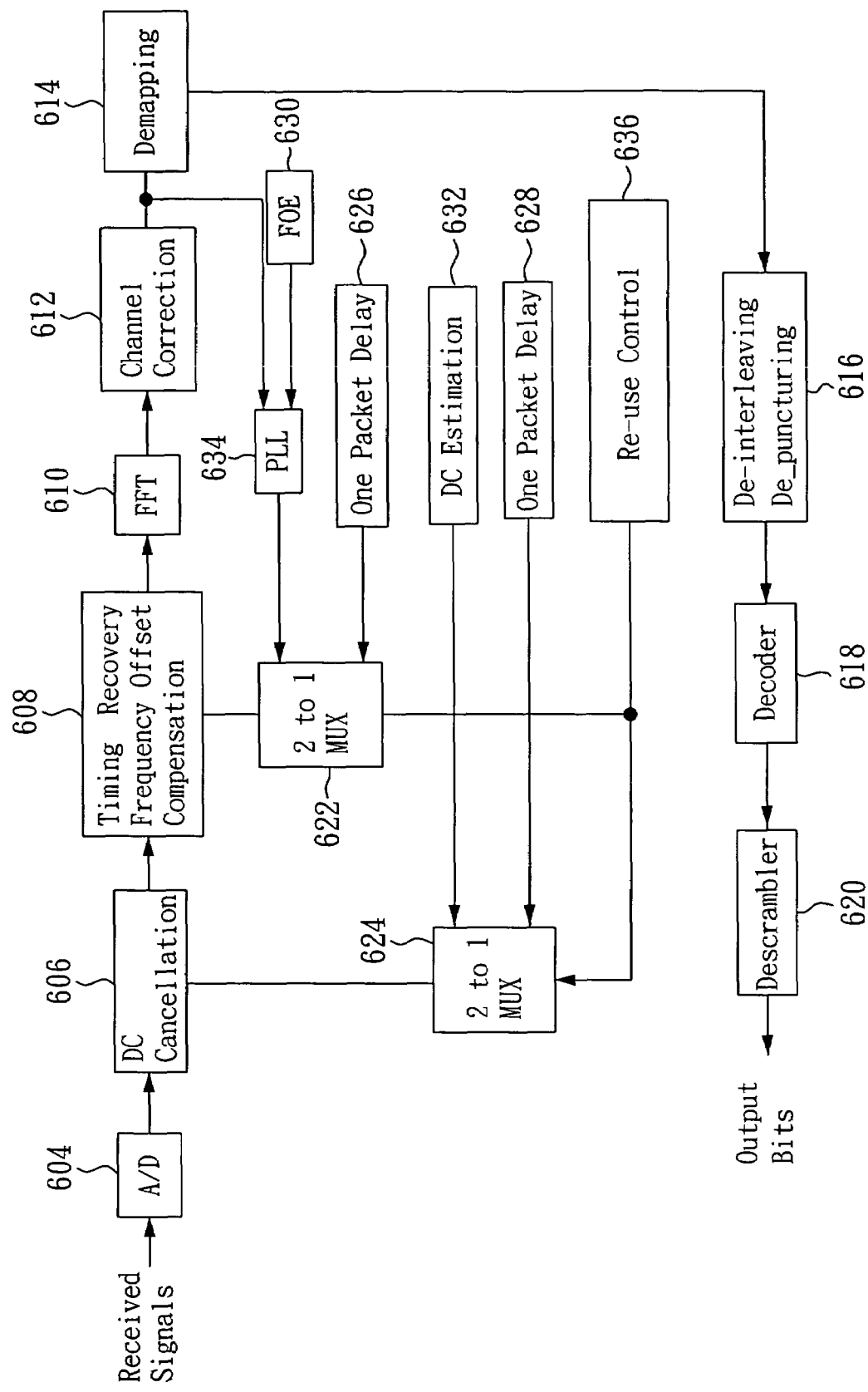
FIG. 6 schematically illustrates a block diagram of the receiver according to the present invention.

FIG. 6 schematically illustrates a block diagram of the receiver according to the present invention. After received signals pass through an A/D converter 604, the DC offset is first removed in the DC cancellation circuit 606. Then, the signals are synchronized and a frequency offset correction is performed in the timing recovery and frequency offset compensation circuit 608. Both the DC cancellation circuit 606 and the timing recovery and frequency offset compensation circuit 608 are controlled, based on a re-use control signal issued by a re-use control circuit 636, to either re-use the DC offset estimation and the frequency offset estimation respectively latched in the buffers 628 and 626 when the MAC_HIT signal and the CRC_OK signal are both asserted previously or use a newly generated DC offset estimation 632 and frequency offset estimation 630. If the number Estm_fail is small than a predetermined number N, 2-to-1 multiplexers will be controlled to pass the DC offset estimation and frequency offset estimation latched in the buffers 628 and 626 to the circuits 606 and 608, respectively.

After timing synchronization and frequency correction, the signals are then transformed to the frequency domain using FFT in a circuit block 610. Subsequently, channel estimation is performed and the channel is corrected in a channel correction circuit 612. At this node, the signal is used for aligning the frequency offset estimation 630 by employing a phase-locked loop (PLL) 634.

Further, the channel corrected signal is de-mapped in a de-mapping circuit 614 and de-interleaved and de-punctured in a de-interleaving and de-puncturing circuit 616. De-interleaved bits output from circuit 616 are decoded by using Viterbi algorithm in a decoder 618 and finally descrambled in a scrambler 620.

Although the preferred embodiment is disclosed employing the IEEE802.11a standard, it should be considered as illustrative and not restrictive. For example, IEEE802.11g standard may be employed in other embodiments. The invention are not limited to be used within a wireless communication system, but may be used in wired communication system as long as the communication system is packet-based.

By re-use of an estimated data for compensating for a signal receiving error, it is possible to further improve the overall receiver performance and stability from packet to packet and the estimation algorithm is allowed to be simplified.

While the present invention has been described with reference to the preferred embodiment thereof, it is to be understood that the invention is not limited thereby. Various modifications and changes could be conceived of by those skilled in the art without departuring from the scope of the present invention, which is indicated by the appended claims.

What is claimed is:

1. A method for processing a received signal in a PHY (Physical) layer of a receiver in a packet-based communication system, comprising the steps of:

compensating the received signal for a signal receiving error in a current packet with an estimated data obtained by re-using a previously latched estimated data to generate a portion of a compensated signal when a number of successive times of estimation failures in previous packets is smaller than a predetermined number;

compensating the received signal for the signal receiving error in the current packet with an estimated data obtained by using a training sequence in the current packet to generate the portion of the compensated signal when the number of successive times of the estimation failures in the previous packets is greater than the predetermined number;

decoding the compensated signal as a decoded signal and delivering the decoded signal to a MAC (Medium Access Control) layer of the receiver;

receiving from the MAC layer a signal for indicating whether or not the receiver is an intended recipient of the current packet;

determining whether or not the current packet is received correctly;

incrementing the number of successive times of estimation failures by one if the receiver is an intended recipient of the current packet and the current packet is not received correctly; and latching the estimated data used in the current packet if the receiver is an intended recipient of the current packet and the current packet is received correctly.

2. The method of claim 1, wherein said estimated data is DC offset estimation.

3. The method of claim 1, wherein said estimated data is frequency offset estimation, and the signal receiving error is a frequency offset error.

4. The method of claim 1, wherein said estimated data is channel estimation, and the signal receiving error is a channel distortion.

5. The method of claim 1, wherein whether or not the receiver is an intended recipient of the current packet is determined by verifying whether or not a destination address of the current packet matches an identity address of the receiver.

6. The method of claim 1, wherein whether or not the current packet is received correctly is determined by cyclic redundancy check (CRC).

7. The method of claim 1, further comprising: continuing to improve accuracy of the estimated data used in the current packet until the end of the current packet.

8. A receiver for a packet-based communication system, comprising:

a compensation circuit, compensating The a received signal for a signal receiving error in a current packet with an estimated data obtained by re-using a previously latched estimated data to obtain a portion of a compensated signal when a re-use control signal is asserted, and compensating the received signal for the signal receiving error in the current packet with an estimated data obtained by using a training sequence in the current packet to obtain the portion of the compensated signal when the re-use control signal is not asserted;

an estimation circuit for generating the estimated data in a current packet;

a decoding circuit for decoding the compensated signal;

a circuit for verifying whether or not the receiver is an intended recipient of the current packet;

a circuit for verifying whether or not the current packet is received correctly;

a circuit for incrementing a number of successive times of estimation failures by one if the receiver is an intended recipient of the current packet and the current packet is not received correctly;

a buffer circuit for latching the estimated data used in the current packet if the receiver is an intended recipient of the current packet and the current packet is received correctly; and a re-use control circuit , asserting the re-use control signal when the number of successive times of the estimation failures in previous packets is smaller than a predetermined number, and de-asserting the re-use control signal when the number of successive times of the estimation failures in the previous packets is greater than the predetermined number.

9. The receiver for a packet-based communication system of claim 8, wherein said estimated data is DC offset estimation.

10. The receiver for a packet-based communication system of claim 8, wherein said estimated data is frequency offset estimation, and the signal receiving error is a frequency offset error.

11. The receiver for a packet-based communication system of claim 8, wherein said estimated data is channel estimation, and the signal receiving error is a channel distortion.

12. The receiver for a packet-based communication system of claim 8, wherein the circuit for verifying whether or not the receiver is an intended recipient of the current packet verifies whether or not a destination address of the current packet matches an identity address of the receiver.

13. The receiver for a packet-based communication system of claim 8, wherein the circuit for verifying whether or not the current packet is received correctly is a cyclic redundancy check (CRC) circuit.

14. The receiver for a packet-based communication system of claim 8, wherein the estimation circuit further improves accuracy of the estimated data used in the current packet until the end of the current packet.

* * * * *